United States Patent
Caditz et al.

(10) Patent No.: US 7,904,585 B1
(45) Date of Patent: Mar. 8, 2011

(54) PREDICTIVE BROWSER AND PROTOCOL PACKAGE

(75) Inventors: David Caditz, Bozeman, MT (US); Norman Abramson, San Francisco, CA (US)

(73) Assignee: SkyWare, Inc., San Francisco, CA (US)

(*) Notice: Subject to any disclaimer, the term of this patent is extended or adjusted under 35 U.S.C. 154(b) by 1609 days.

(21) Appl. No.: 10/933,444

(22) Filed: Sep. 3, 2004

Related U.S. Application Data

(60) Provisional application No. 60/500,356, filed on Sep. 5, 2003.

(51) Int. Cl.
*G06F 15/173* (2006.01)

(52) U.S. Cl. .......................... 709/238; 709/223; 709/227

(58) Field of Classification Search .................. 709/203, 709/223, 227, 230, 238
See application file for complete search history.

(56) References Cited

U.S. PATENT DOCUMENTS

| | | | |
|---|---|---|---|
| 6,415,329 B1* | 7/2002 | Gelman et al. ................. 709/245 |
| 6,874,019 B2* | 3/2005 | Hamilton et al. ............. 709/219 |
| 7,068,643 B1* | 6/2006 | Hammond ..................... 370/352 |
| 7,162,535 B2* | 1/2007 | Kustov et al. ................. 709/235 |
| 2002/0165925 A1* | 11/2002 | Hamilton et al. ............. 709/213 |
| 2009/0164395 A1* | 6/2009 | Heck ............................... 706/16 |
| 2009/0210806 A1* | 8/2009 | Dodson et al. ................ 715/760 |

FOREIGN PATENT DOCUMENTS

WO WO 2007078275 A2 * 7/2007

* cited by examiner

*Primary Examiner* — Faruk Hamza
(74) *Attorney, Agent, or Firm* — James Creighton Wray

(57) ABSTRACT

The present invention provides transparent proxies for random access channels. Client proxies and server proxies are provided at opposite ends of random access channels. The Predictive Browser (PB) of the present invention replicates many of the client browser functions at the Server Proxy in order to predict and encode the client traffic flowing in an ALOHA channel to the server. The replication moves the browser function away from the user into the Server Proxy on the other side of the random access channel. Several methods have been developed to reduce ALOHA channel HTTP traffic. These methods are Proxy Recursion and Page Caching, Request Tokenizing, Predictive Tokenizing and Request Compression. These methods, collectively integrated into the invention, reduce the amount of data required to be sent across the ALOHA channel.

20 Claims, 9 Drawing Sheets

A User click is generated and input to the Client Browser
B Click is translated into a URL in a TCP packet
C Packet is transformed by the IB into a coded click within a RAP packet
D Coded click is transformed into a URL in a TCP packet Request Tokenizing Scheme

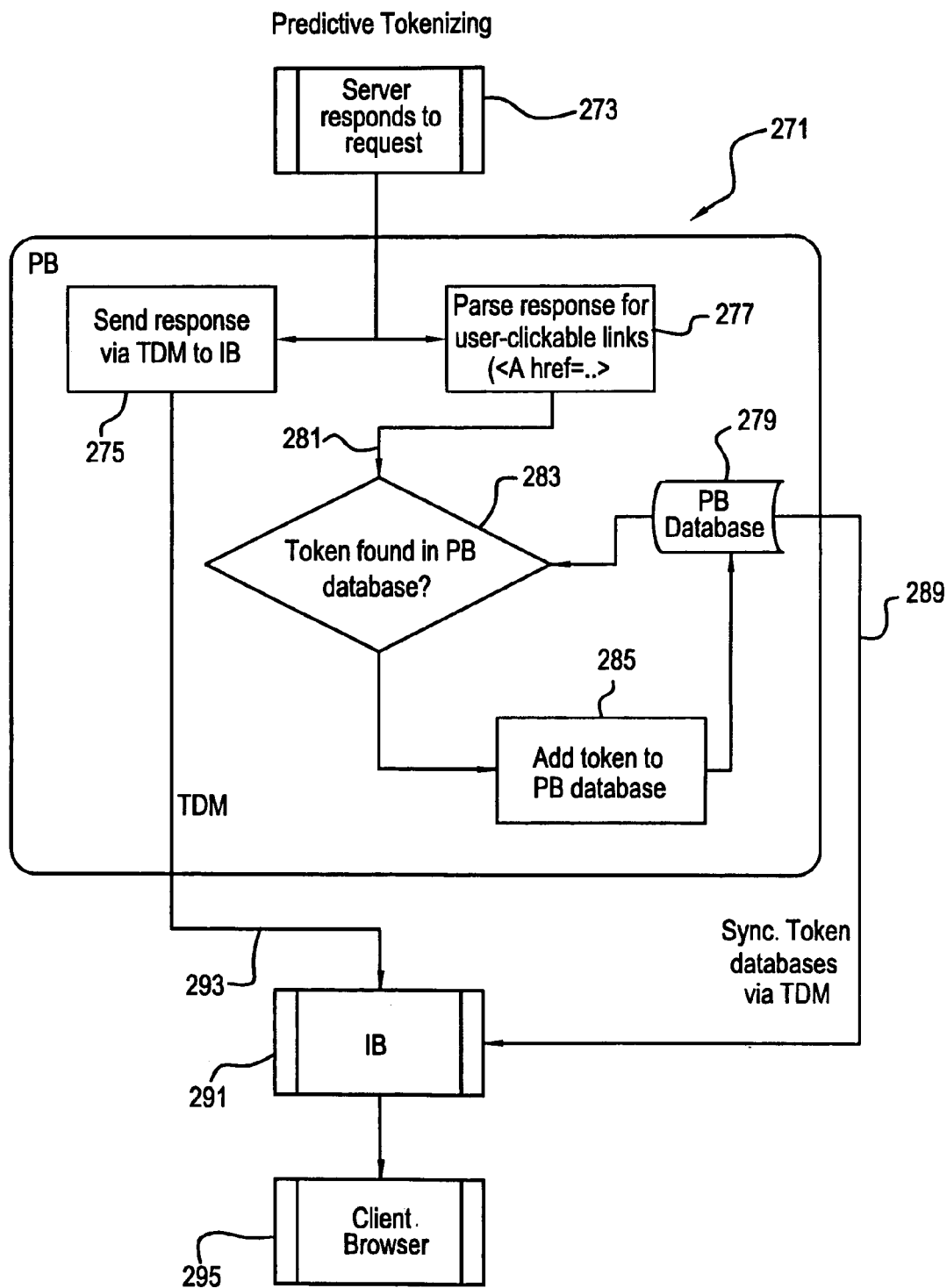

PREDICTIVE BROWSER AND PROTOCOL PACKAGE

This application claims the benefit of U.S. Provisional Application No. 60/500,356, filed Sep. 5, 2003.

BACKGROUND OF THE INVENTION

TCP/IP is an almost universal protocol that was developed in the 1970's and is still used by nearly all Internet traffic. The TCP/IP protocol is no longer suitable for certain Internet applications. This is particularly true for wireless access channels, both satellite and terrestrial. These channels are assuming a greater role with the development of two-way VSAT access to the Internet and the introduction of 3G networks. In both cases, the cost of the access channel, usually some form of ALOHA channel, from the user to the network is the determining factor in any analysis of network costs. The inefficiencies introduced by the TCP in this class of channels translates directly to lower network capacity and lower revenue per channel.

The replacement of TCP does not appear to be a feasible strategy despite TCP being ill suited to ALOHA access. Attempts to deal with the shortcomings of the combination of TCP and random access channels focus on the introduction of transparent proxies. This leaves the existing Internet protocol structure unchanged. A transparent proxy is simply a protocol translation entity acting dynamically on packets within the Internet so that its introduction is transparent to the Internet and to the user.

Transparent proxies are commonly used to mask the effects of satellite delay in broadband VSAT Internet access. These transparent proxies may also be used in efficient transmission of trunking traffic within the Internet. However, in many applications for individual and small groups of users the paramount concern is the cost of the access channels, which is the dominant cost within the overall networks, rather than the cost of the Internet trunking channel that is the dominant cost for the backbone network provider.

Needs exist for improved methods and tools for using random access channels. Needs exist for improved transparent proxies for random access channels.

SUMMARY OF THE INVENTION

The present invention teaches methods to reduce data sent from an HTTP client (such as a web browser) to a web server on the Internet via an ALOHA-type wireless link channel.

A preferred embodiment comprises two or more software components, placed on either side of a wireless link. The component on the client side of the link is called the Inverse Browser (IB) and the component on the server side is the Predictive Browser (PB). The IB and PB together act as a transparent proxy and neither the client nor server need be aware of their existence. The system intercepts network traffic and performs functions that reduce the amount of data sent from client to server over an ALOHA channel.

The present invention provides transparent proxies for random access channels. Client proxies and server proxies are provided at opposite ends of random access channels. This invention focuses on the introduction of advanced transparent proxies for ALOHA random access channels.

Results indicate it is possible such proxies achieve an initial improvement of a factor of approximately 10× in the access channel, with a long-term potential improvement between approximately 100× and 1000× or more. The transparent proxies, through protocol translation and application compression, achieve desired performance goals. Additionally, the proxies are written with a dynamic structure so the structure can accommodate dynamic traffic characteristics of the Internet.

The Predictive Browser (PB) of the present invention replicates many of the client browser functions at the Server Proxy in order to predict and encode the client traffic flowing in an ALOHA channel to the server. The replication moves many of the common browser functions away from the user into the Server Proxy on the other side of the random access channel.

Traditional TCP/IP protocols have many shortcomings. Common solutions to the problems with TCP/IP invoke transparent proxies that do not change the underlying structure of the Internet protocol.

The present invention is a transparent proxy for TCP and other related protocols, for example, HTTP, within an ALOHA access channel to the Internet. The proxy protocol operates in a certain region of a network. The network is composed of one or more individual clients. The clients are connected to the Internet via a server. The present invention may also be used for a client or group of clients connected by an ALOHA channel. Here, a modem is used to connect to the Internet.

A transparent proxy is implemented by two primary components, the Server Proxy, at the Internet connection, and the Client Proxy, at the client access point. Generally, in an ALOHA channel there are many Client Proxies for each Server Proxy. The operation of the proxy within the client access channel results in a transformation of the single end-to-end connection from a client to the Internet server into multiple sequential end-to-end connections. The first and last of these connections involves the transmission of conventional TCP/IP packets. The middle connections involve the transmission of some form of protocol matched to the random nature of the ALOHA channel. This protocol is referred to as a Random Access Protocol (RAP). The random access channels also transmit a small number of TCP/IP packets that cannot be easily compressed by the transparent proxy.

The Client Proxy and the Server Proxy are essentially mirror images of each other because each of the various layered functions at one end of the proxy connection corresponds to an inverse at the other end of the connection. The first layer of the new transparent proxy is a conventional physical layer. This layer is unchanged from the case without the use of a proxy.

The next two layers of the new transparent proxy are similar to TCP/IP protocol compression and text compression elements suggested for use in traffic-oriented proxies. A traffic oriented proxy is simply the conventional form of a proxy emphasizing operations on the total network traffic, as opposed to the proxies emphasizing efficiency in the ALOHA channel of interest.

The protocol compression box allows for the case of no operation on certain packets in the network. This reflects the fact that certain types of Internet traffic resist the simple initial strategies developed in versions of the transparent proxy. This Internet traffic is dealt with in later processes.

The final layer of the proxy architecture consists of an Inverse Browser (IB), on the Client Proxy side, and a Predictive Browser (PB), on the Server Proxy side. A separate IB and PB are required for each client screen. The IB simply transforms the HTTP representation of client actions back into a more efficient coded representation of the client action. The IB performs a table lookup function to reverse the HTTP transformation performed by the client browser. Even if the original transformation in the client browser does not have a unique inverse, the IB does not require such a unique inverse. Any inverse will do.

A larger number of PB's than IB's may be used. This is simply a reflection of the fact that the PB's, located at the Server Proxy provide services for large numbers of Client Proxies sharing the same random access channel.

The PB replicates the complete client browser function at the Server Proxy in order to predict and encode the client traffic flowing in an ALOHA channel to the server. The replication moves the browser function away from the user into the Server Proxy on the other side of the random access channel.

The ability to efficiently implement such a replication relies on the fact that there are relatively few possible client responses to a given browser page. Since the page is usually delivered to the user by the server proxy, the server proxy can run its own version of the browser used by the client at the other end of the client proxy to determine the set of possible client responses and greatly reduce traffic flowing in the ALOHA channel. Under certain common conditions the use of a PB significantly decreases channel latency.

Implementation of the PB leads to interesting possibilities. For example, with the precipitous drop in the cost of processors and memory it is possible to consider a collection of separate parallel processors in the Server Proxy, each processor devoted to the task of duplicating the processing at the client's browser. By introducing the Predictive Browser with a separate processor for each active client, the TCP connection intensive processing is moved from the client side of the random access Internet connection to the server side of that connection. The IB module at the client proxy then need only transmit an efficient coding of the client response selected.

The mechanics of such an efficient coding of a client response is not hard to implement. Indeed most of the implementation is already included in the normal functioning of the client browser. There are a small number of general client actions that initiate an HTTP fetch command. Some of the most common of these user actions are: the reload button, the forward/backward buttons, clicking within a displayed document, selection of menu items, and user input of a URL.

All of these actions except the last involve user choices selectable from the screen presented by the browser. As such these user choices can be available to both the conventional browser, located at the user terminal, and the predictive browser, located much closer to the Internet server on the other side of the random access channel. Thus for each active client browser there is a shadow predictive browser with a list of potential user actions identical to that of the user browser.

For the simple case of a single client action, such as a single mouse click, generating a URL from the client browser, the coding process, and the translation of that action into a sequence of TCP/IP packets and back again can be explained by tracing the consequences of a user action at a terminal. The translation of the user action into TCP/IP packets at the client browser, then into a RAP transmission at the client proxy and finally back into TCP/IP packets at the server proxy can be traced by combining the protocol definitions with the Client Proxy and Server Proxy operations.

The following is an example of a trace for a single web client. When a user clicks on a particular option within a web page and inputs information into a Client Browser, the user browser translates that click into the selection of a URL in a TCP packet. An HTTP request is transmitted along with the URL to fetch the desired information. The IB transforms the packet into a coded click within a RAP packet. Then, the coded click is transformed into a URL in a TCP packet. A browser may initiate multiple TCP connections to more than one server in response to a single mouse click and each of these additional connections may, in principle, refer to other connections.

These multiple connections ordinarily result in excessive traffic in the random access channel providing the Internet connection. However, with the introduction of the Predictive Browser, the management of client TCP connections is shifted to the other side of the random access channel. Since the Predictive Browser has the same information available to the client browser the only information transmitted in the random access channel is the minimum information required to encode the user choice selected.

The typical opening of a TCP connection involves a three-way handshake from one end of the channel to the other, while a typical closing of such a connection involves a four-way handshake. Since the protocol of an ALOHA channel ordinarily includes a positive acknowledgement upon delivery of each packet, the various acknowledgements required in establishing and terminating a TCP connection duplicate this feature of ALOHA channels. The consequence of this duplication in all random access channels, but especially in the satellite random access channel, is a greatly increased response time as perceived by the end user.

The use of a Predictive Browser eliminates much of the unnecessary traffic in the channel, but also eliminates many of the duplicate acknowledgements in the channel. The end result is a channel with greatly decreased latency as perceived by the end user, as well as greatly reduced traffic as measured by the network operator.

It should be noted that the ability of a Predictive Browser to establish multiple connections at a location closer to the web server means that a Predictive Power can provide performance improvements in perceived user latency even when an Inverse Browser and a Random Access Protocol (RAP) are not used to decrease the traffic in the access channel to the Internet. Thus a Predictive Browser can be of value whenever a single user action can result in the establishment of multiple TCP connections.

The browser translation of a user click into the general response of fetching a resource from a server must rely on a table lookup procedure within the browser of all possible clicks, specifying the web resource to be retrieved for that click. The central function of the Inverse Browser is to perform the inverse of this table lookup. It is not necessary that this inverse procedure have a unique value. Since the information required at the Predictive Browser input on the other side of the random access channel is used only to establish a connection or set of connections, it does not matter if a different user action is specified as long as that action leads to the same set of connections.

Thus, an alternative embodiment is suggested. The central function of the IB is simply to undo the TCP connection specification of the client browser. Elimination of the table lookup in the client browser and the table lookup in the Inverse Browser provides a simple coded representation of the user action directly out of the client browser. This output is used as the input to the Predictive Browser, saving processing time for the two table lookup procedures.

Several methods have been developed to reduce ALOHA channel HTTP traffic. These methods are Proxy Recursion and Page Caching, Request Tokenizing, Predictive Tokenizing and Request Compression. These methods, collectively integrated into the invention, reduce the amount of data required to be sent across the ALOHA channel by factors of about several hundred to about several thousand, depending on the types of web pages being accessed and the habits of network users.

Proxy Recursion and Page Caching: HTTP Client-Server communication uses a request/response model. A client typically initiates a session with a server by sending a request for a particular document. The server processes the request and responds with the requested document. The HTTP request is transmitted via an ALOHA channel and is therefore of interest for the IB and PB investigation.

The HTTP request contains, at a minimum, the request method, the URL for the requested document and the HTTP version in the form of a request line. The request may also contain additional lines specifying how the server should process the request, e.g. browser version or accepted language. A typical request might contain 200-300 characters.

The HTTP Response consists of an HTTP Response Header followed by a single blank line and then the requested document. The Response Header contains information about the document including the date last modified, content type, content length, etc. The HTTP document is of particular interest because it may contain recursive references to other documents. Under normal circumstances, the browser responds to such document references by automatically generating new requests and obtaining the referenced document in a new server response. The new responses may themselves contain document references that generate new request/response cycles. References documents are typically images, style sheets and frame documents.

Because the HTTP Request/Response cycle is recursive, numerous automatic requests can be generated from a single user web page request or a single mouse click. As an example, opening a common URL may generate approximately 20 recursive HTTP requests, causing approximately 6000 bytes to be sent from the client to the server to display a single web document. One function of the IB/PB pair is to move recursive requests to the server side of the ALOHA channel.

In a typical HTTP client/server interaction in the absence of the IB/PB, an initial request is the result of action on the part of the client (e.g., requesting a web page or clicking on a browser button or link). Additional requests are then browser generated recursive requests for additional referenced documents.

Since the initial request represents a user action, it cannot be removed from the ALOHA channel (although it may be compressed and/or tokenized). Recursive requests, however, can be displaced to the server side of the ALOHA channel using the IB/PB scheme. The IB/PB passes the initial request to the server. It intercepts responses, parses them to detect document references, and generates recursive requests. All responses are then passed to the client. Additionally, the IB/PB ignores recursive requests generated by the client.

Two issues must be handled by the IB/PB to make the process transparent to the client and server: 1) The HTTP request headers of the recursive requests generated by the PB must be appropriately constructed for a client browser, and 2) the recursive documents must be provided by the IB to the client browser in the proper order at the proper time.

The HTTP request contains the URL of the requested document together with any number of request header key/value pairs. The key/value pairs contain information about the client browser such as the browser type and version, acceptable language, acceptable document types and encoding. The PB parses the original request and stores key/value pairs from the original request header. When the PB generates recursive requests, the request headers use the stored values.

When a document is returned to the client browser, the browser searches the document for referenced files and generates new requests for these documents. Except for the original request generated by the user, these recursive requests are blocked by the IB and are not sent through the ALOHA channel. In a parallel process, however, the PB parses each document returned by the server and, by proxy, generates all recursive requests. When a document reference is found, the URL is combined with the stored original request header to create a request for the new document. The request is then passed to the server for processing. The server returns the referenced document to the PB. and the PB parses it and searches for further recursive document requests. The procedure repeats until no further referenced documents are found.

There is no guarantee that the PB will deliver the set of documents generated by the original request in the order expected by the client browser. Different browsers, for example, may use different algorithms for parsing HTML pages. Recent testing shows that even a given browser may not request the same set of documents in a predictable or repeatable way. Therefore, as documents are sent from the PB to the IB, they are stored in a cache until the client browser needs them. If the client requests a document that is contained in the IB cache, the document is returned immediately to the browser from cache. If the document is not contained in cache, a new request for the document is generated. The PB's HTML parsing engine is responsible for examining all documents requested by the IB for recursive links. When links are found, the referenced documents is retrieved from the server and posted to the IB cache. If the PB HTML parsing engine is accurate and complete, only the original user generated request is required to pass through the ALOHA channel.

Request Tokenizing: A second method for reducing HTTP request header traffic on the ALOHA channel is to encode request headers using small, unique tokens, which are passed across the ALOHA channel and decoded by the PB into a normal request headers.

A database of request headers is maintained on the PB. Each unique request header is assigned a token of approximately six characters in length. Periodically, the database is copied to the IB using a TDM channel so the IB and PB maintain duplicate, identical copies of the token/request header database.

A normal request header, generated by a user action, is sent from a client browser to the IB. The IB looks for a copy of the header in the IB database and if found, replaces the header with its token, sending approximately 6 bytes across the ALOHA channel. If the header is not found in the IB database, it is passed to the PB without encoding, sending about 300-400 bytes in the ALOHA channel.

When the PB receives a token, it looks up the associated header in the PB database, decodes it and sends it to the server.

If the PB receives a normal request header, meaning a token was not found in the IB database, it stores the header in the PB database, assigns the header a new token and sends the request header on to the server. The next time the IB/PB databases are synchronized, the new header/token pair appears in the IB database.

With this method, commonly requested web pages eventually have associated tokens in the IB and PB databases and the request headers for these pages can be tokenized before they are sent across the ALOHA channel, reducing traffic by a factor of 50 or more.

The tokenizing scheme described requires that a web page be visited at least once by a network containing an IB before a request can be tokenized. Subsequent requests to the same site are replaced by tokens, saving a factor of approximately 50 in ALOHA channel traffic. The overall ALOHA channel traffic reduction depends on the characteristics of network web usage and in particular on the fraction of pages visited more than one time.

Predictive Tokenizing Another tokenizing method is called predictive tokenizing. This method attempts to tokenize request headers for pages before the user requests them. Predictive tokenizing could provide a greater reduction in ALOHA traffic than request tokenizing.

In a predictive tokenizing method, when a user requests a web page using the IB/PB system, a PB requests a page from a server and delivers it to an IB via a TDM channel. After the page is delivered, the PB parses the page for HTML anchors (user clickable links to other web pages), generates request headers for the linked documents and adds the requests to a token/header database. If the user then clicks on a link within the current page to request a referenced page, the IB is able to find a corresponding token in its database even if the page has never been visited before on that network.

Request Compression: An original HTTP client request represents a user action and information contained in the request is needed (together with any recursive requests) to generate the requested document. If the request cannot be encoded from data in the IB/PB databases, it has to be sent in full over the ALOHA channel. A request header is plain text and typically consists of 200-300 characters. It is possible to use standard text compression techniques to reduce the header size when passed between the IB and PB on the ALOHA channel. Since most of the words used in a request header consist of key/value pairs that can assume a small number of predefined values, it is possible to achieve compression ration far better than standard lossless compression schemes.

These and further and other objects and features of the invention are apparent in the disclosure, which includes the above and ongoing written specification, with the claims and the drawings.

BRIEF DESCRIPTION OF THE DRAWINGS

FIG. 12 is a flow diagram for a predictive tokenizing scheme.

DETAILED DESCRIPTION OF THE PREFERRED EMBODIMENTS

The Predictive Browser (PB) of the present invention replicates the complete client browser function at the Server Proxy in order to predict and encode the client traffic flowing in an ALOHA channel to the server. The replication moves the browser function away from the user into the Server Proxy on the other side of the random access channel.

Traditional TCP/IP protocols have many shortcomings. Common solutions to the problems with TCP/IP invoke transparent proxies that do not change the underlying structure of the Internet protocol.

Figure 1:
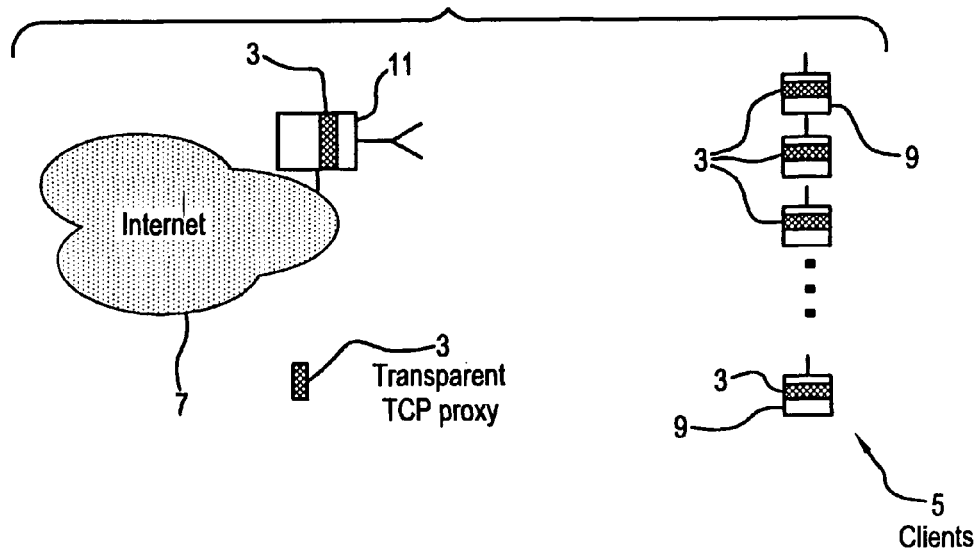
FIG. 1 is a diagram of transparent proxies within an ALOHA access channel.

FIG. 1 shows the placement of transparent proxies 3 for TCP and certain other related protocols, for example, HTTP, within an ALOHA access channel to the Internet 7. The proxy protocol 3 operates only in the shaded region of a network 5. The network 5 is composed of one or more individual clients 9. The clients 9 are connected to the Internet 7 via a server 11.

Figure 2:
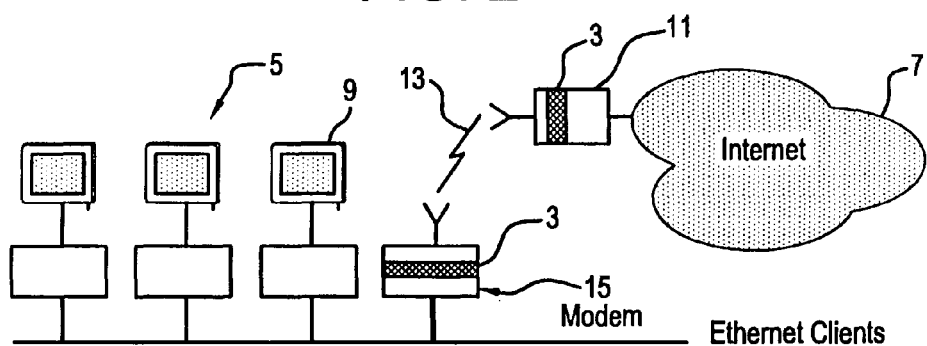
FIG. 2 is a diagram of a transparent proxy for an Internet connection.

The use of a transparent proxy 3 for a client 9 or group of clients 5 connected by an ALOHA channel 13 is shown in FIG. 2. Again, the proxy protocol 3 operates only in that part of the network that is stippled and shaded. A modem 15 is used to connect to the Internet 7.

The inefficiencies of TCP are generated by a wide variety of causes, some of which are easy to separate from the structure of the transport layer protocols, and some of which are closely coupled to these protocols. The philosophy is to reach for the low hanging fruits on the protocol tree and to implement more invasive proxying techniques only after these low hanging fruits are harvested. Certain kinds of Internet traffic may resist some simpler strategies implemented in initial stages of the proxies, but this traffic can be bypassed in the initial stages and dealt with later.

Figure 3:
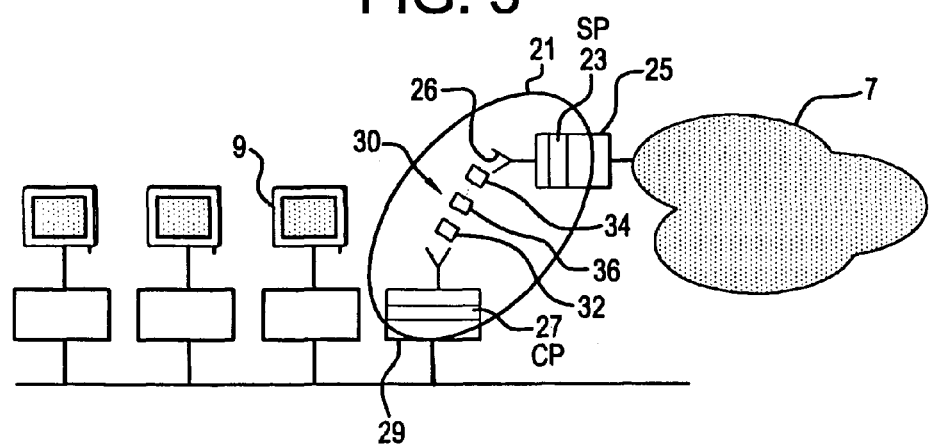
FIG. 3 is a diagram of a highlighted transparent proxy for an Internet connection.

The design of the new transparent proxy system is shown in the highlighted section 21 of FIG. 3. The highlighted transparent proxy 21 is implemented by two primary components, the Server Proxy (SP) 23, at the Internet connection 25, and the Client Proxy (CP) 27, at the client access point 29. Generally, in an ALOHA channel there are many Client Proxies 27 for each Server Proxy 23.

Figure 4:
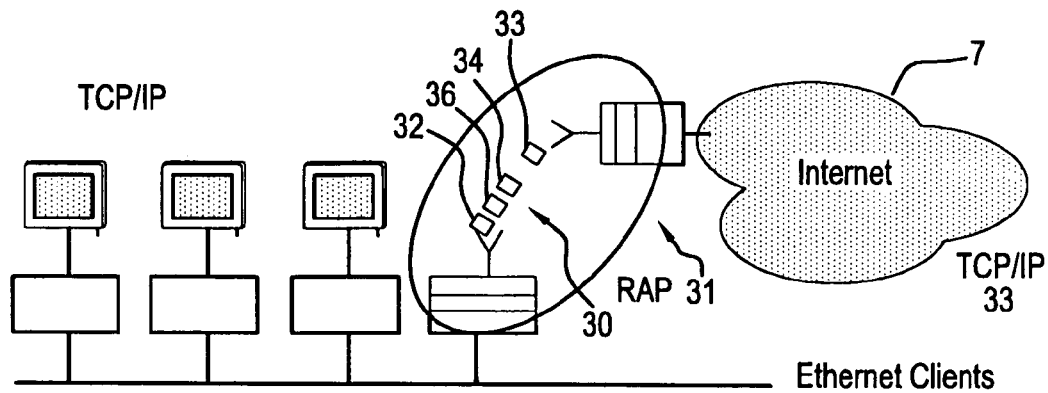
FIG. 4 is a diagram of TCP/IP and RAP connections between a client and the Internet.

FIG. 3 shows the operation of the proxy 21 within a client access channel 26. The operation results in a transformation of the single end-to-end connection from a client 9 to the Internet server into three sequential end-to-end connections 30. The first 32 and last 34 of these connections involves the transmission of conventional TCP/IP packets. The middle connection 36 involves the transmission of some form of protocol matched to the random nature of the ALOHA channel. This protocol is referred to as a Random Access Protocol (RAP) 31 (FIG. 4). The random access channel also transmits a small number of TCP/IP packets 33 that cannot be easily compressed by the transparent proxy.

FIG. 4 indicates the three sequential connections within the same diagram used for FIG. 3.

Figure 5:
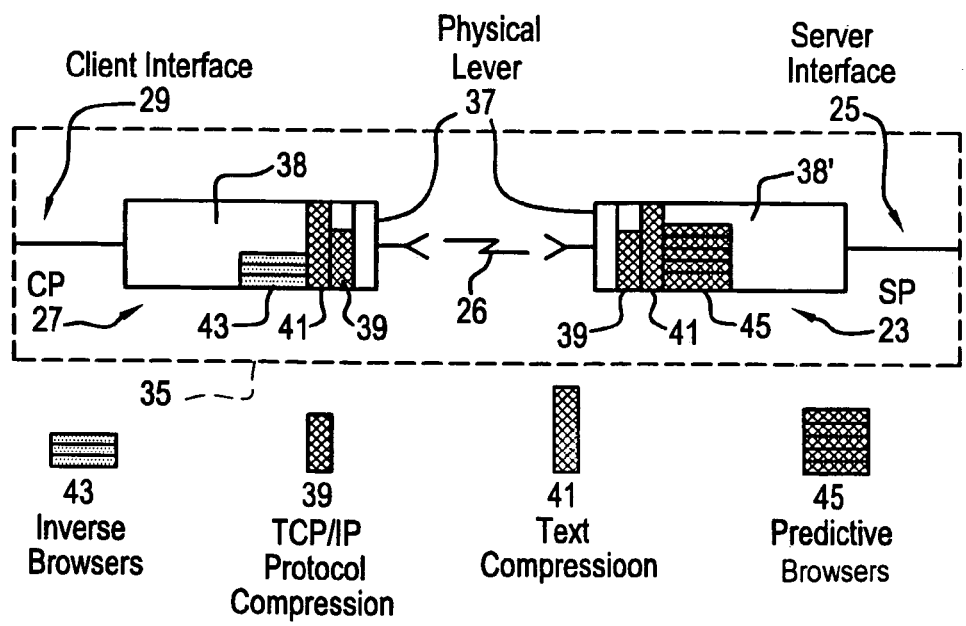
FIG. 5 is a diagram of a highlighted transparent proxy for an Internet connection.

FIG. 5 depicts a specific preliminary high-level description of the new transparent proxy architecture 35. The various components of the highlighted transparent proxy are implemented in a modular structure.

The Client Proxy 27 and the Server Proxy 23 are essentially mirror images of each other because each of the various layered functions 38 at one end of the proxy connection corresponds to an inverse layered function 38' at the other end of the connection. The first layer of the new transparent proxy, moving in either direction from the center of FIG. 5, is a conventional physical layer 37. This layer is unchanged from the case without the use of a proxy.

The next two layers of the new transparent proxy are similar to TCP/IP protocol compression 39 and text compression 41 elements suggested for use in traffic-oriented proxies. A traffic oriented proxy is simply the conventional form of a proxy emphasizing operations on the total network traffic, as opposed to the proxies emphasizing efficiency in the ALOHA channel of interest.

The protocol compression box 39 in FIG. 5 allows for the case of no operation on certain packets in the network. This reflects the fact that certain types of Internet traffic resist the strategies developed in the initial versions of the transparent proxy. This traffic is bypassed in the initial stages of development.

The final layer of the proxy architecture consists of an Inverse Browser (IB) 43, on the Client Proxy 27 side, and a Predictive Browser (PB) 45, on the Server Proxy 23 side. A separate IB 43 and PB 45 are required for each client screen. The IB 43 simply transforms the HTTP representation of client actions back into a more efficient coded representation of the client action. The IB 43 performs a table lookup function to reverse the HTTP transformation performed by the client browser. Even if the original transformation in the client browser does not have a unique inverse, the IB 43 does not require such a unique inverse. Any inverse will do.

FIG. 5 indicates a larger number of PB's 45 than IB's 43. This is simply a reflection of the fact that the PB's 45, located at the Server Proxy 23 provide services for large numbers of Client Proxies 27 sharing the same random access channel.

The Predictive Browser (PB) 45 is shown in FIG. 5. The PB 45 replicates the complete client browser function at the Server Proxy 23 in order to predict and encode the client traffic flowing in an ALOHA channel 26 to the server. The replication moves the browser function away from the user into the Server Proxy 23 on the other side of the random access channel.

The ability to efficiently implement such a replication relies on the fact that there are relatively few possible client responses to a given browser page. Since the page is usually delivered to the user by the server proxy, the server proxy can run its own version of the browser used by the client at the other end of the client proxy to determine the set of possible client responses and greatly reduce traffic flowing in the ALOHA channel 26. Under certain common conditions the use of a PB 45 significantly decreases channel latency.

Implementation of the PB leads to interesting possibilities. For example, with the precipitous drop in the cost of processors and memory it is possible to consider a collection of separate parallel processors in the Server Proxy, each processor devoted to the task of duplicating the processing at the client's browser. By introducing the Predictive Browser with a separate processor for each active client we have effectively moved the TCP connection intensive processing from the client side of the random access Internet connection to the server side of that connection. The IB module 43 at the client proxy 27 then need only transmit an efficient coding of the client response selected.

The mechanics of such an efficient coding of a client response is not hard to implement. Indeed most of the implementation is already included in the normal functioning of the client browser. There are a small number of general client actions that initiate an HTTP fetch command. Some of the most common of these user actions are: the reload button, the forward/backward buttons, clicking within a displayed document, selection of menu items, and user input of a URL.

All of these actions except the last involve user choices selectable from the screen presented by the browser. As such these user choices can be available to both the conventional browser, located at the user terminal, and the predictive browser, located much closer to the Internet server on the other side of the random access channel. Thus, for each active client browser there is a shadow predictive browser with a list of potential user actions identical to that of the user browser.

For the simple case of a single client action, such as a single mouse click, generating a URL from the client browser, the coding process, and the translation of that action into a sequence of TCP/IP packets and back again can be explained by tracing the consequences of a user action at a terminal. The translation of the user action into TCP/IP packets at the client browser, then into a RAP transmission at the client proxy and finally back into TCP/IP packets at the server proxy can be traced by combining the protocol definitions illustrated in FIG. 6 with the Client Proxy and Server Proxy operations illustrated in FIG. 5.

Figure 6:
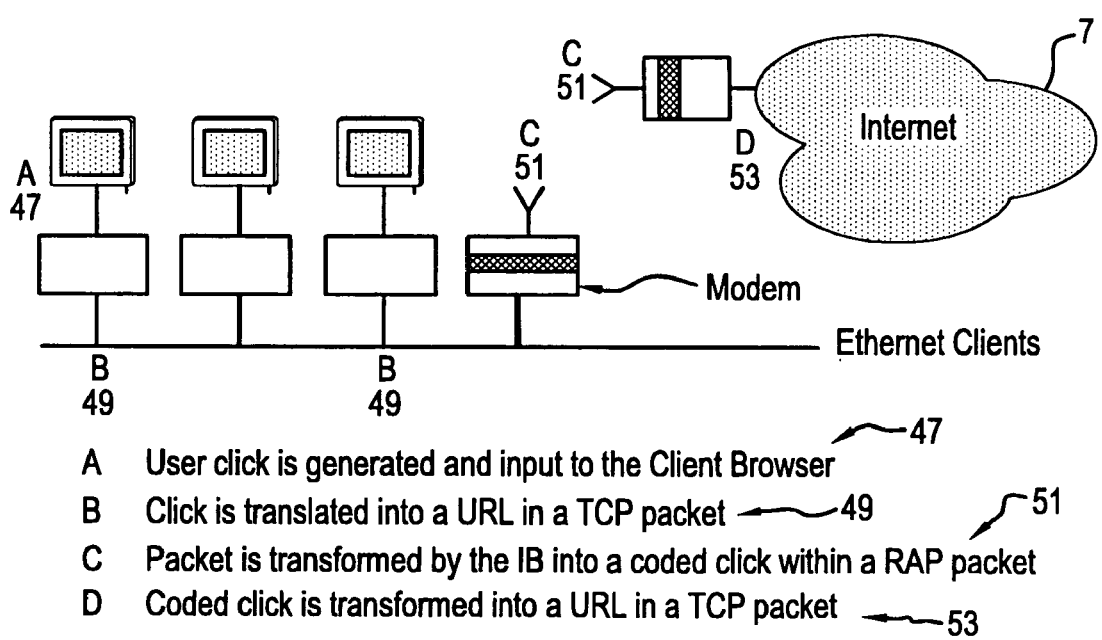
FIG. 6 is a diagram tracing the transformation of a single user click.

A trace for a single web client is shown in FIG. 6. When a user clicks on a particular option within a web page and inputs information into a Client Browser A 47, the user browser translates that click into the selection of a URL in a TCP packet B 49. An HTTP request is transmitted C 51 along with the URL to fetch the desired information. The IB 43 (FIG. 5) transforms the packet B 49 into a coded click within a RAP packet C 51. Then, the coded click is transformed into a URL in a TCP packet 53. A browser may initiate multiple TCP connections to more than one server in response to a single mouse click and each of these additional connections may, in principle, refer to other connections.

These multiple connections ordinarily result in excessive traffic in the random access channel providing the Internet connection. However, with the introduction of the Predictive Browser 45 (FIG. 5), the management of client TCP connections is shifted to the other side of the random access channel 26. Since the Predictive Browser 45 has the same information available to the client inverse browser 43, the only information transmitted in the random access channel is the minimum information required to encode the user choice selected.

The typical opening of a TCP connection involves a three-way handshake from one end of the channel to the other, while a typical closing of such a connection involves a four-way handshake. Since the protocol of an ALOHA channel ordinarily includes a positive acknowledgement upon delivery of each packet, the various acknowledgements required in establishing and terminating a TCP connection duplicate this feature of ALOHA channels. The consequence of this duplication in all random access channels, but especially in the satellite random access channel, is a greatly increased response time as perceived by the end user.

The use of a Predictive Browser 45 eliminates much of the unnecessary traffic in the channel 26 and also eliminates many of the duplicate acknowledgements in the channel. The end result is a channel with greatly decreased latency as perceived by the end user, as well as greatly reduced traffic as measured by the network operator.

It should be noted that the ability of a Predictive Browser 45 to establish multiple connections at a location closer to the web server means that a Predictive Power provides performance improvements in perceived user latency, even when an Inverse Browser 43 and a Random Access Protocol (RAP) 31 are not used to decrease the traffic in the access channel to the Internet. Thus, a Predictive Browser is of value whenever a single user action can result in the establishment of multiple TCP connections.

The browser translation of a user click into the general response of fetching a resource from a server must rely on a table lookup procedure within the browser of all possible clicks, specifying the web resource to be retrieved for that click. The central function of the Inverse Browser 43 is to perform the inverse of this table lookup. It is not necessary that this inverse procedure have a unique value. Since the information required at the Predictive Browser input on the other side of the random access channel is used only to establish a connection or set of connections, it does not matter if a different user action is specified as long as that action leads to the same set of connections.

Thus, an alternative embodiment is suggested. The central function of the IB is simply to undo the TCP connection specification of the client browser. Elimination of the table lookup in the client browser and the table lookup in the Inverse Browser provides a simple coded representation of the user action directly out of the client browser. This output is used as the input to the Predictive Browser, saving processing time for the two table lookup procedures.

Several methods have been developed to reduce ALOHA channel HTTP traffic. These methods are Proxy Recursion and Page Caching, Request Tokenizing, Predictive Tokenizing and Request Compression. These methods, collectively integrated into the invention, reduce the amount of data required to be sent across the ALOHA channel by factors of about several hundred to about several thousand, depending on the types of web pages being accessed and the habits of network users.

Figure 7:
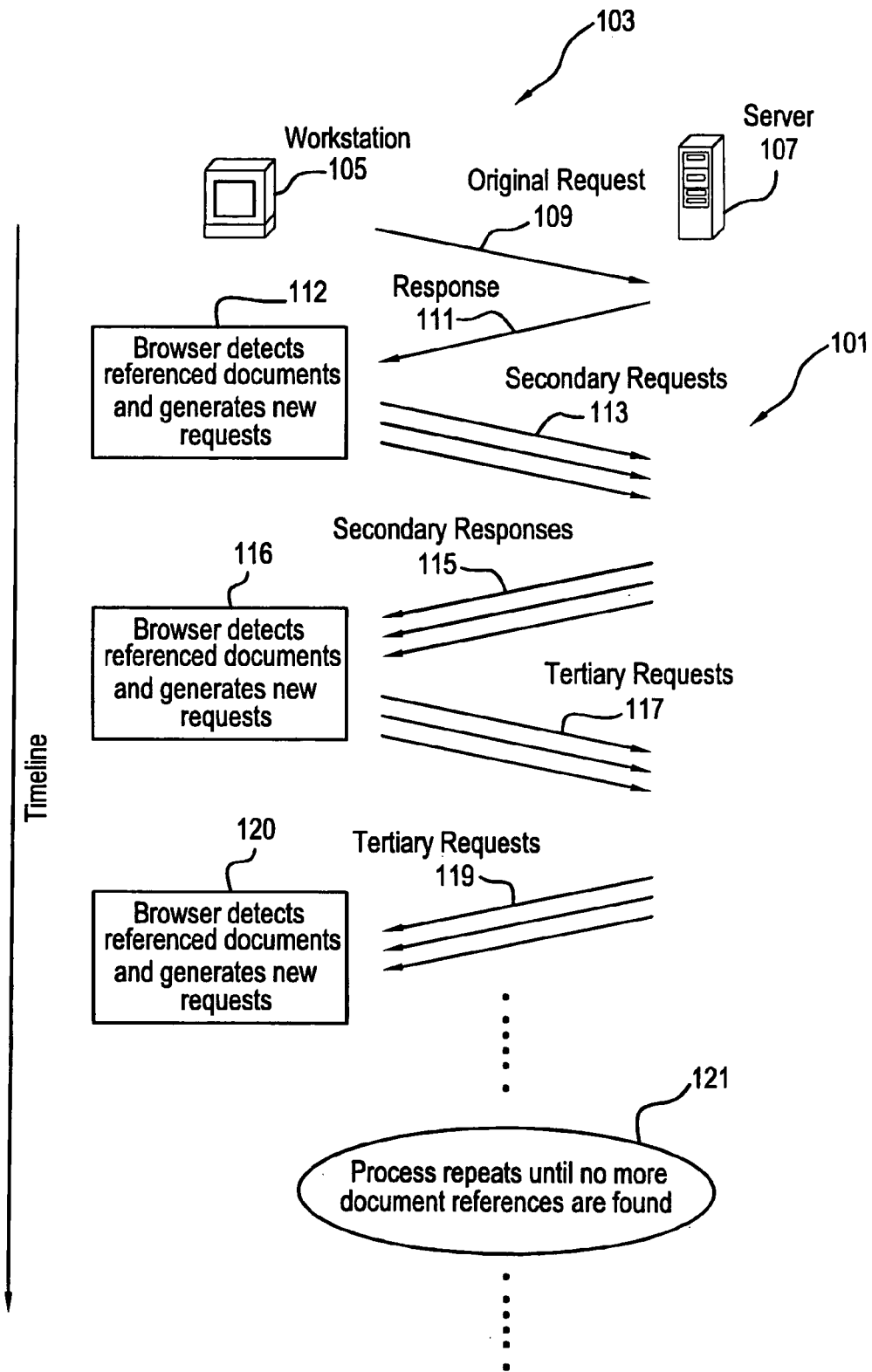
FIG. 7 is a flowchart timeline of an HTTP request/response session of the present invention with numerous HTTP requests generated from a single user action.

Proxy Recursion and Page Caching: FIG. 7 shows a typical timeline of an HTTP request/response session. HTTP Client-Server communication uses a request/response model 101. A client workstation 105 typically initiates a session with a server 107 by sending a request 109 for a particular document. The HTTP request 109 is transmitted via an ALOHA channel 103 and is therefore of interest for the IB and PB investigation. The HTTP request 109 contains, at a minimum, the request method, the URL for the requested document and HTTP version in the form of a request line (e.g., "GET http://www.hokupaa.com/index.html HTTP/1.0"). The request may also contain additional lines specifying how the server should process the request, e.g., browser version or accepted language. A typical request might contain 200-300 characters.

The server 107 processes the request 109 and responds 111 with the requested document. The HTTP response 111 consists of an HTTP Response Header followed by a single blank line and then the requested document. The Response Header contains information about the document including the date last modified, content type, content length, etc. The HTTP document is of particular interest because it may contain recursive references to other documents. The browser detects the referenced documents 112. Under normal circumstances, the browser responds to such document references by automatically generating new requests 113 and obtaining the referenced document in a new server response 115. The new responses may themselves contain document references that, when detected by the browser 116, generate a new request 117, response 119 and detection 120 cycle. References documents are typically images, style sheets and frame documents. The process repeats until no more document references are found 121.

Because the HTTP Request/Response cycle 101 is recursive, numerous automatic requests can be generated from a single user web page request or a single mouse click. As an example, opening a common URL may generate approximately 20 recursive HTTP requests, causing approximately 6000 bytes to be sent from the client to the server to display a single web document. One function of the IB/PB pair is to move recursive requests to the server side of the ALOHA channel 103.

In a typical HTTP client/server interaction in the absence of the IB/PB, an initial request 109 is the result of action on the part of the client (e.g., requesting a web page or clicking on a browser button or link). Additional requests 113, 117 are then browser generated recursive requests for additional referenced documents.

Figure 8:
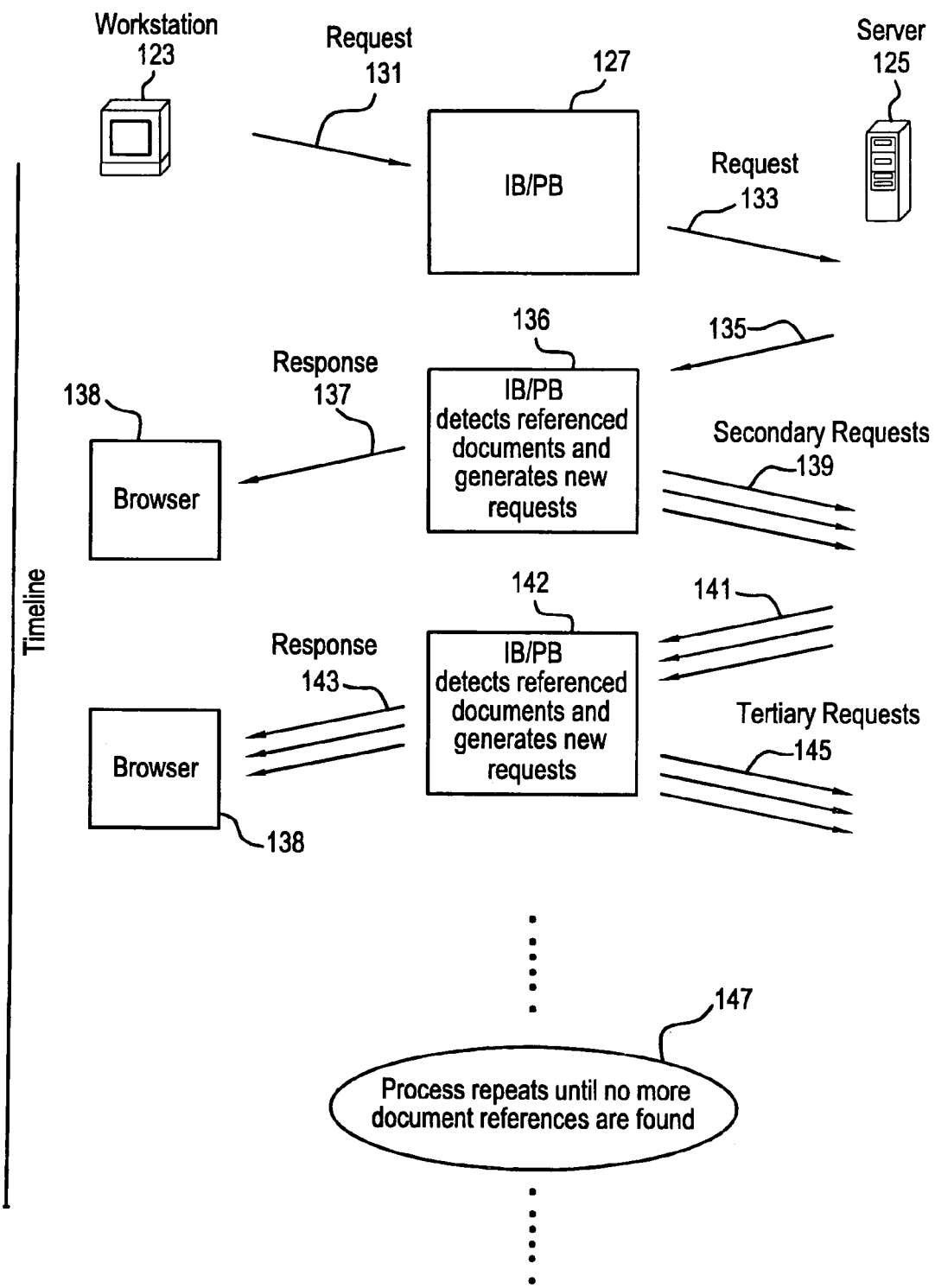
FIG. 8 is a flowchart timeline of an HTTP session with recursive requests generated by an IB/PB instead of a client browser.

FIG. 8 is a flowchart timeline of an HTTP session with recursive requests generated by an IB/PB instead of a client browser. Since an initial request 131 represents a user action from a workstation 123, it cannot be removed from the ALOHA channel (although it may be compressed or coded). Recursive requests 139, 145 however, can be displaced to the server side of the ALOHA channel using the IB/PB scheme in FIG. 8. An initial request 131 is sent to an IB/PB 127 and then the request 133 is sent to a server 125. The IB/PB 127 intercepts 136, 142 responses 135, 141 and parses the responses 135, 141 to detect document references. The IB/PB 127 then generates recursive requests 139, 145. All responses 137, 143 from the IB/PB 127 pass to a browser 138. Additionally, the IB/PB 127 ignores recursive requests from the client workstation 123. The cycle continues until no more document references are found 147.

Figure 9:
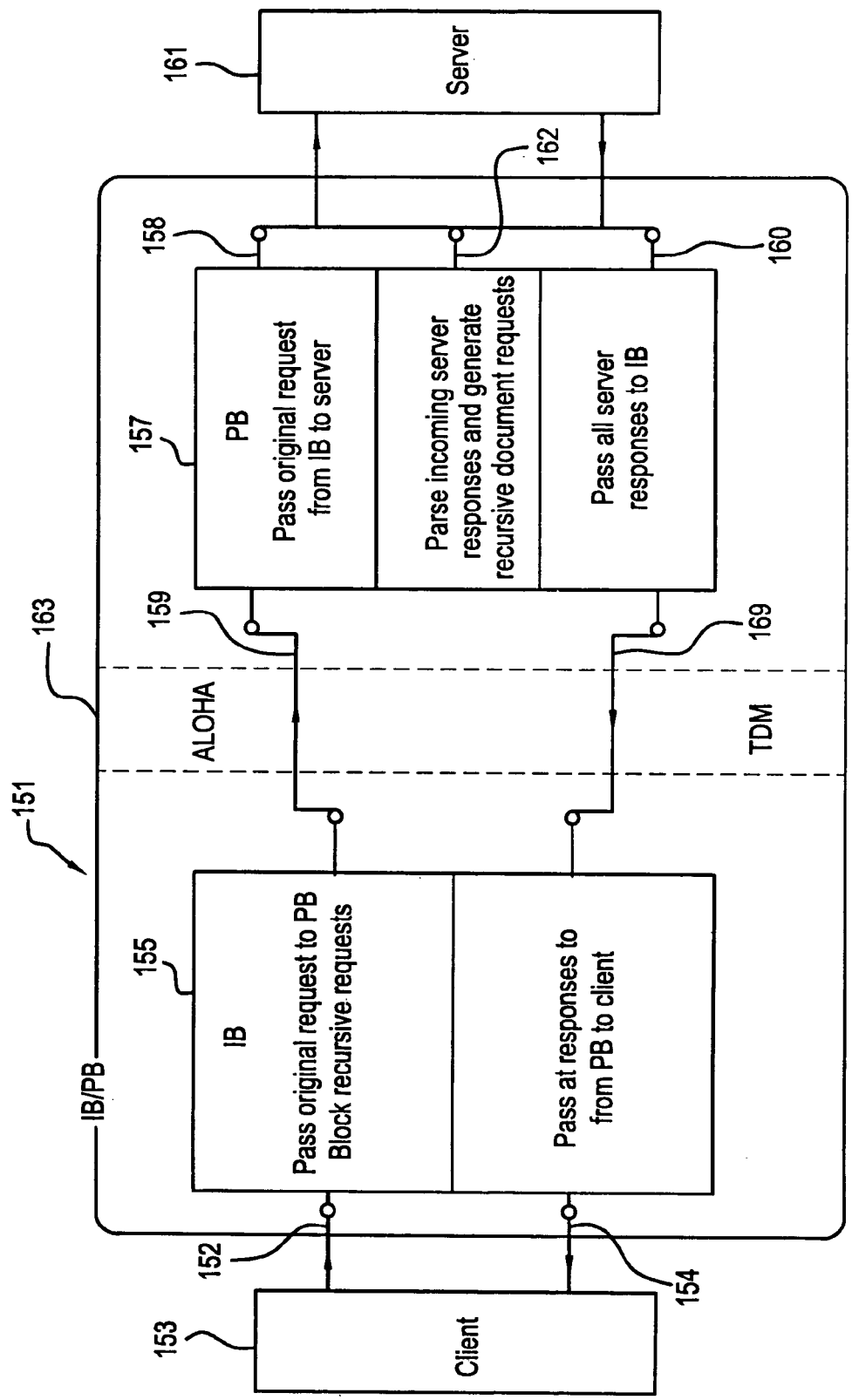
FIG. 9 is a block diagram of the IB/PB software components required to move recursive requests to server side of ALOHA channel.

FIG. 9 shows a block diagram of the IB/PB software components required to move recursive requests to server side of ALOHA channel. Within the IB/PB 151, an initial request 152 is received from the client 153. The IB 155 passes a request 159 to the PB 157 over the ALOHA channel 163. The PB 157 passes the original request 158 to a server 161 that generates a response 160. The response 160 is passed to the PB 157 that parses the response 160 and generates any recursive document requests 162. All responses 169 are passed over the ALOHA channel 163 to the IB 155 which passes the responses 154 on to the client 153. The IB 155 blocks any additional transmission requests from the client 152.

Two issues must be handled by the IB/PB 151 to make the process transparent to the client and server: 1) The HTTP request headers of the recursive requests generated by the PB must be appropriately constructed for a client browser and 2) the recursive documents must be provided by the IB to the client browser in the proper order at the proper time.

Figure 10:
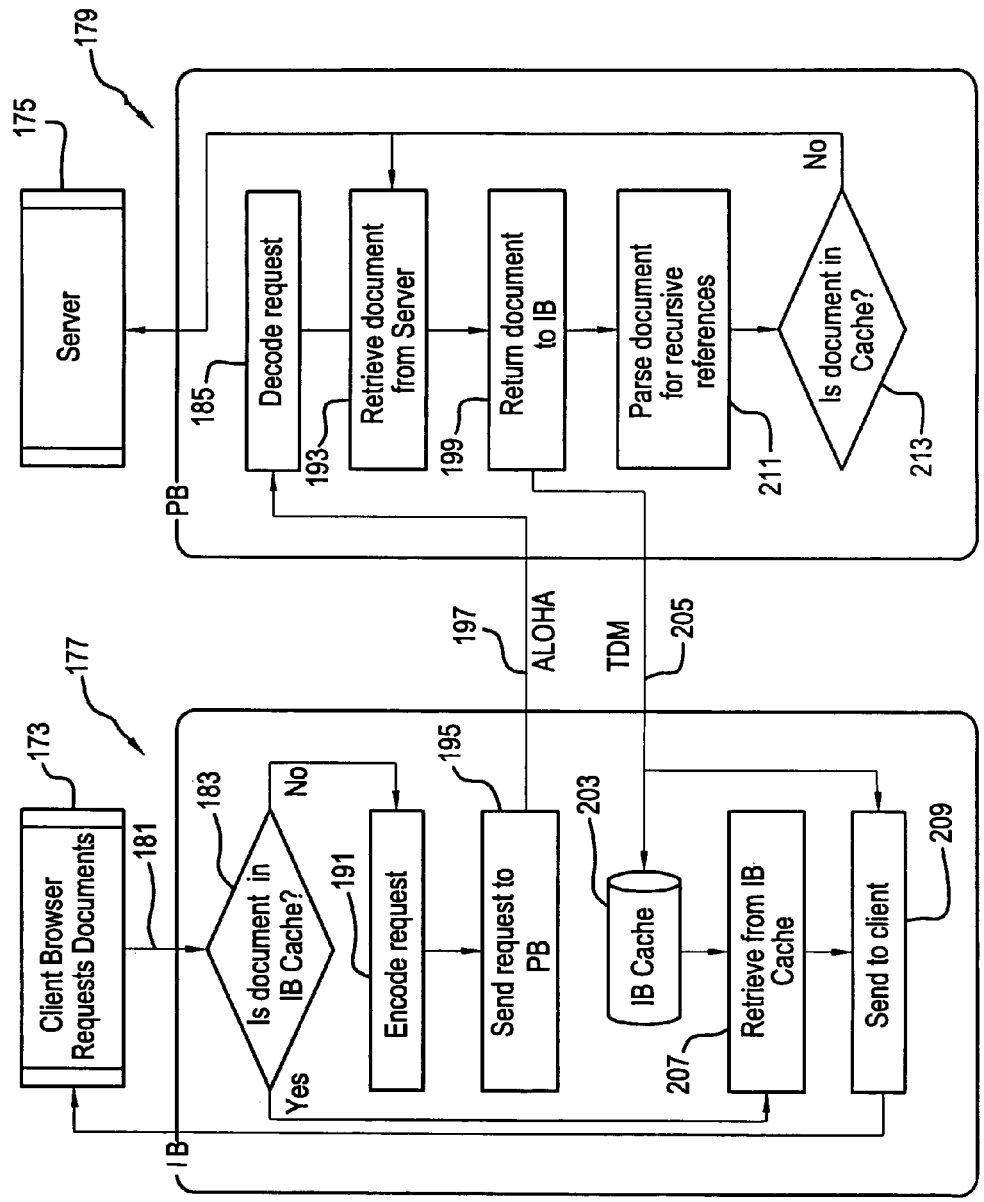
FIG. 10 is a flowchart showing details of the IB and PB logic designed to deliver documents to client in correct order while minimizing recursive requests sent through the ALOHA channel.

FIG. 10 is a flowchart showing details of an IB 177 and PB 179 logic designed to deliver documents to client in correct order while minimizing recursive requests sent through the ALOHA channel. The system begins with a client request generated by a user action 173. The PB 179 detects recursive document references and generates requests. Referenced documents are returned via the TDM channel to the IB 177 and stored in an IB Cache 203 until requested by the client browser.

An HTTP request 181 from the client browser 173 contains the URL of the requested document and any number of request header key/value pairs. The key/value pairs contain information about the client browser 173, such as the browser type and version, acceptable language, acceptable document types and encoding. The PB 179 therefore must parse 185 the original request and store key/value pairs from the original request header. When the PB 179 generates recursive requests 211, the request headers use stored values 213.

When a document is returned to the client browser 205, the browser searches the document for referenced files and generates new requests for these documents. Except for the original request generated by the user, these recursive requests are blocked by the IB and are not sent through the ALOHA channel. In a parallel process, however, the PB 179 parses each document returned by the server 193 and, by proxy, generates all recursive requests 211. When a document reference is found, the URL is combined with the stored original request header to create a request for the new document 213. The request is then passed to the server 175 for processing. The server 175 returns the referenced document, which is parsed 193, and searches for further recursive document requests. The procedure repeats until no further referenced documents are found.

There is no guarantee that the PB will deliver the set of documents generated by the original request in the order expected by the client browser. Different browsers, for example, may use different algorithms for parsing HTML pages. Recent testing shows that even a given browser may not request the same set of documents in a predictable or repeatable way. Therefore, as documents are sent 205 from the PB to the IB, they are stored in a cache 203 until the client browser needs them. If the client browser 173 requests 181 a document that is contained 183 in the IB cache 203, the document is retrieved 207 from the cache 203 and sent 209 to the browser 173 from cache 203. If the document is not contained in cache 203, the request is encoded 191 and sent 195 to the PB 179 over an ALOHA connection 197.

The PB's 'HTML parsing engine' is responsible for examining all documents requested by the IB for recursive links. Requests from the IB 177 are decoded 185 in the PB 179. When links are found, the referenced documents is retrieved 189 from the server 175, returned 199 to the IB cache 203 over a channel 205. If the PB HTML parsing engine is accurate and complete, only the original user generated request is required to pass through the ALOHA channel.

Figure 11:
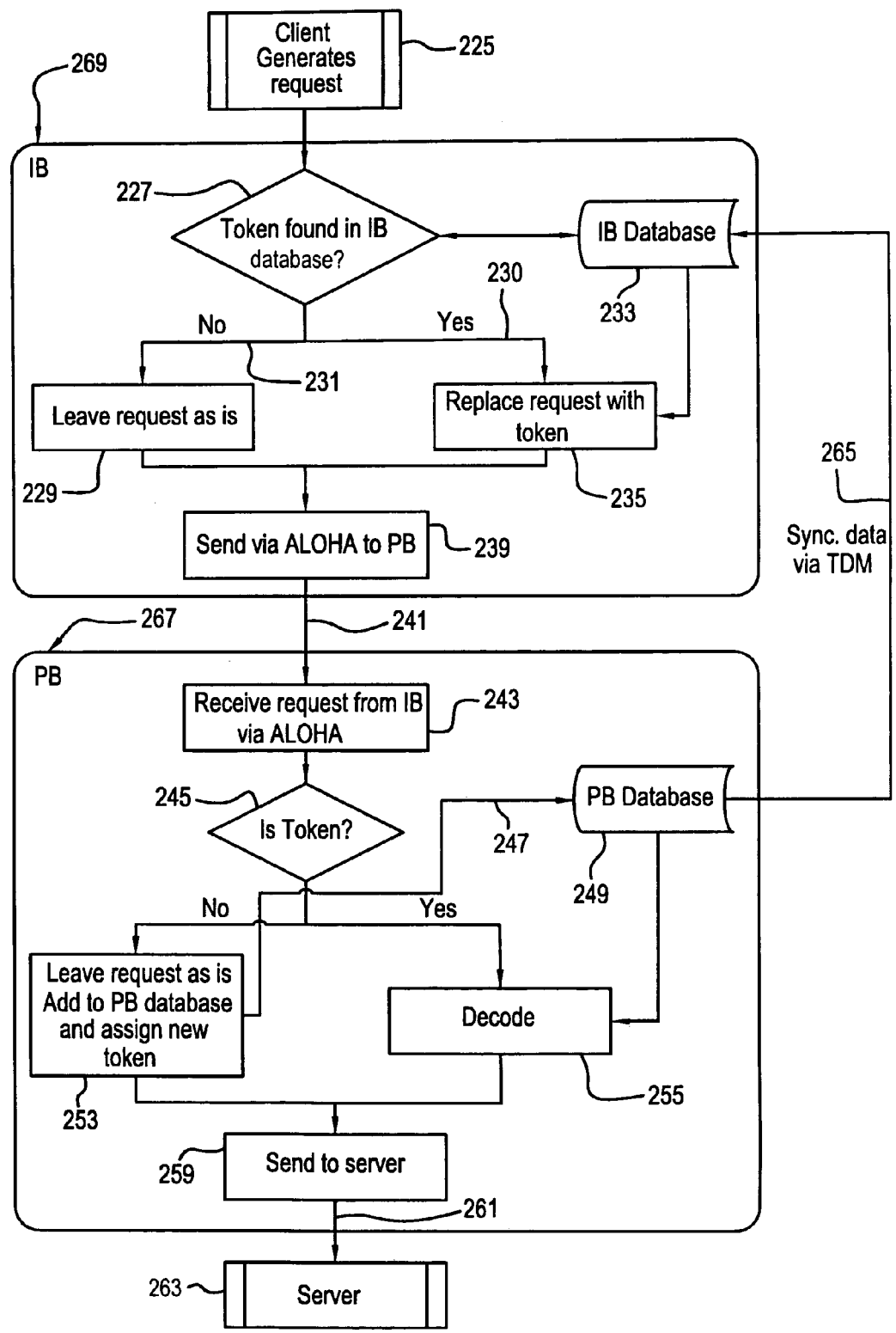
FIG. 11 is a flow diagram for a request tokenizing scheme.

Request Tokenizing: FIG. 11 shows a flow diagram for a request tokenizing scheme. A second method for reducing HTTP request header traffic on the ALOHA channel is to encode request headers using small, unique tokens, which are passed across the ALOHA channel and decoded by the PB into a normal request headers.

A PB database 249 of request headers is maintained on the PB 267. Each unique request header is assigned 253 a token of approximately six characters in length. Periodically, the database is copied 265 to an IB database 233 on an IB 269 using a TDM channel so the IB 269 and PB 267 maintain duplicate, identical copies 233, 249 of the token/request header database.

A normal request header, generated by a user action 225, is sent from a client browser to the IB 269. The IB looks 227 for a copy of the header in the IB database 233 and if found 230, replaces 235 the header with its token, sending 239 approximately 6 bytes across 241 the ALOHA channel. If the header is not found 231 in the IB database, it is passed 229 to the PB without encoding, sending 239 approximately 300-400 bytes in the ALOHA channel 241.

When the PB receives 243 a token 245, it looks up the associated header in the PB database 249, decodes it 255 and sends 259 the result 261 to the server 263.

If the PB receives a normal request header 253, meaning a token was not found in the IB database 233, it stores 247 the header in the PB database 249, assigns the header a new token and sends the request header on to the server. The next time the IB/PB databases are synchronized 265, the new header/token pair appears in the IB database.

With this method, commonly requested web pages eventually have associated tokens in the IB and PB databases 233, 249 and the request headers for these pages can be tokenized before they are sent across the ALOHA channel 241, reducing traffic by a factor of 50 or more.

The tokenizing scheme described requires that a web page be visited at least once by a network containing an IB before a request can be tokenized. Subsequent requests to the same site are replaced by tokens, saving a factor of approximately 50 in ALOHA channel traffic. The overall ALOHA channel traffic reduction depends on the characteristics of network web usage and in particular on the fraction of pages visited more than one time.

Predictive Tokenizing: FIG. 12 shows a flow diagram for a predictive tokenizing scheme. This method attempts to tokenize request headers for pages before the user requests them. Predictive tokenizing could provide a greater reduction in ALOHA traffic than request tokenizing.

In a predictive tokenizing method, when a user requests 273 a web page using the IB/PB system, a PB 271 requests a page from a server and delivers 275 it to an IB 291 via a TDM channel 293. After the page is delivered, the PB parses 277 the page for HTML anchors (user clickable links to other web pages), generates request headers 281 for the linked documents, checks 283 a PB database 279 for an existing token, and adds 285 the requests to a token/header database if the token is not found. If the user then clicks on a link within the current page to request a referenced page, the IB 291 is able to find a corresponding token in its database even if the page has never been visited before on that network. The PB database 279 sends a signal to the IB 291. The IB receives signals 293, 289 from TDM 275 and from the PB database 279, respectively. The IB then sends a signal to a client browser 295.

Request Compression: An original HTTP client request represents a user action and information contained in the request is needed (together with any recursive requests) to generate the requested document. If the request cannot be encoded from data in the IB/PB databases, the request is sent in full over the ALOHA channel. A request header is plain text and typically consists of 200-300 characters. It is possible to use standard text compression techniques to reduce the header size when passed between the IB and PB on the ALOHA channel. Since most of the words used in a request header consist of key/value pairs that can assume a small number of predefined values, it is possible to achieve compression ration far better than standard lossless compression schemes.

While the invention has been described with reference to specific embodiments, modifications and variations of the invention may be constructed without departing from the scope of the invention, which is defined in the following claims.

The invention claimed is:

1. A transparent proxy comprising:
   one or more client computers or a network of client computers,
   one or more client browsers on each of the one or more client computers or the network of client computers,
   a client proxy at a client access point,
   a connection between the one or more client computers or the network of client computers and the client access point,
   a server proxy on an opposite side of a channel from the client proxy, a collection between the server proxy and the Internet, an end-to-end connection across the channel between the client proxy and the server proxy for transferring packets from the client proxy to the server proxy and from the server proxy to the client proxy,
   one or more predictive browsers located on the server proxy completely replicating the one or more client browser functions at the server proxy and moving the one or more client browser functions away from a user and into the server proxy;

wherein the end-to-end connection between the client proxy and the server proxy is multiple sequential end-to-end connections.

2. The transparent proxy of claim 1, wherein client browser functionality is transferred from the one or more client computers or the network of client computers onto the server proxy.

3. The transparent proxy of claim 1, wherein the channel is a random access channel.

4. The transparent proxy of claim 1, wherein the first and last sequential end-to-end connections are conventional TCP/IP packets, and the middle end-to-end connections are transmissions of protocol matched to the nature of a channel.

5. The transparent proxy of claim 1, wherein a minimal amount of information is transferred from the client proxy to the server proxy.

6. The transparent proxy of claim 1, wherein packets that are not readily compressible are transmitted uncompressed through the connection between the client proxy and the server proxy.

7. The transparent proxy of claim 1, wherein the one or more predictive browsers on the server proxy run a copy of the client browser for predicting a set of possible client responses.

8. The transparent proxy of claim 1, wherein the one or more client browsers each have a corresponding copy of the client browsers on the server proxy.

9. The transparent proxy of claim 8, wherein each copy of the client browsers has a list of potential client responses identical to that of the one or more client browsers.

10. The transparent proxy of claim 1, wherein the client proxy and the server proxy are inverses.

11. The transparent proxy of claim 10, wherein the first layer is a physical layer, the next layers are TCP/IP protocol compression and text compression, and the last layer is an inverse browser on the client proxy side of the channel and a predictive browser on the server proxy side of the channel.

12. The transparent proxy of claim 11, wherein separate inverse browsers and predictive browsers are required for each client browser screen.

13. The transparent proxy of claim 11, wherein the inverse browser performs a table lookup function for reversing a transformation performed by the client browser.

14. The transparent proxy of claim 13, wherein if a transformation does not have a unique inverse, the inverse browser does not require a unique inverse.

15. The transparent proxy of claim 1, wherein duplicate acknowledgements are eliminated in the random access channels.

16. The transparent proxy of claim 1, wherein processing time is conserved.

17. The transparent proxy of claim 1, wherein a simple coded representation of a client response is provided directly out of the client browser to the predictive browser on the server proxy.

18. The transparent proxy of claim 1, wherein table lookup procedures are eliminated by providing a coded representation of a user action directly out of the client browser and utilizing the coded representation in the predictive browser.

19. The transparent proxy of claim 1, wherein flow of traffic in the channel is decreased.

20. The transparent proxy of claim 1, wherein channel latency is decreased.

* * * * *